(12) United States Patent
Peng et al.

(10) Patent No.: US 9,995,602 B2
(45) Date of Patent: Jun. 12, 2018

(54) TIME GRATING LINEAR DISPLACEMENT SENSOR BASED ON ALTERNATING LIGHT FIELD

(71) Applicant: CHONGQING UNIVERSITY OF TECHNOLOGY, Chongqing (CN)

(72) Inventors: Donglin Peng, Chongqing (CN); Xiaokang Liu, Chongqing (CN); Min Fu, Chongqing (CN); Haojie Xia, Chongqing (CN); Ge Zhu, Chongqing (CN)

(73) Assignee: CHONGQING UNIVERSITY OF TECHNOLOGY, Chongqing (CN)

( * ) Notice: Subject to any disclaimer, the term of this patent is extended or adjusted under 35 U.S.C. 154(b) by 174 days.

(21) Appl. No.: 15/036,353

(22) PCT Filed: Nov. 13, 2014

(86) PCT No.: PCT/CN2014/090968
§ 371 (c)(1),
(2) Date: May 12, 2016

(87) PCT Pub. No.: WO2015/078301
PCT Pub. Date: Jun. 4, 2015

(65) Prior Publication Data
US 2016/0273942 A1 Sep. 22, 2016

(30) Foreign Application Priority Data
Nov. 29, 2013 (CN) .................. 2013 1 0632299.8

(51) Int. Cl.
*G01D 5/36* (2006.01)
*G01D 5/347* (2006.01)
*G01B 11/14* (2006.01)

(52) U.S. Cl.
CPC ......... *G01D 5/34746* (2013.01); *G01B 11/14* (2013.01); *G01D 5/34715* (2013.01); *G01D 5/36* (2013.01)

(58) Field of Classification Search
CPC .. G01D 5/34746; G01D 5/36; G01D 5/34715; G01B 11/14
See application file for complete search history.

(56) References Cited

U.S. PATENT DOCUMENTS 2,996,625 A * 8/1961 De Neergaard ....... G01B 11/00
250/225
4,743,838 A * 5/1988 Eckerle ................ G01D 5/2415
324/660

FOREIGN PATENT DOCUMENTS

CN 1869594 A 11/2006
CN 2869768 Y 2/2007
(Continued)

OTHER PUBLICATIONS

International Search Report, Application No. PCT/CN2014/083125, dated Dec. 31, 2014, 5 pages.
(Continued)

*Primary Examiner* — Tony Ko
(74) *Attorney, Agent, or Firm* — JCIPRNET

(57) ABSTRACT

A time grating linear displacement sensor based on an alternating light field, comprising a fixed pole plate and a movable pole plate, wherein the upper part and the lower part of the fixed pole plate are respectively provided with a row of square fixed pole plate light-transmitting surfaces which are uniformly distributed; the upper part and the lower part at the rear of the fixed pole plate are respectively provided with one group of light-emitting devices; the upper part and the lower part of the movable pole plate are respectively provided with two semi-sinusoidal movable pole plate light-transmitting surfaces; and four light-sensi-
(Continued)

tive receiving units are fixed on the movable pole plate, the photoelectric receiving surfaces of the light-sensitive receiving units covering the movable pole plate light-transmitting surfaces. The two groups of light-emitting devices respectively provide an alternating light field. The movable pole plate moves relative to the fixed pole plate.

5 Claims, 4 Drawing Sheets

(56) References Cited

FOREIGN PATENT DOCUMENTS

| CN | 101556138 A | 10/2009 |
|---|---|---|
| CN | 102288100 A | 12/2011 |
| CN | 102425987 A | 4/2012 |
| CN | 101591896 A | 2/2014 |
| CN | 103822571 A | 5/2014 |
| EP | 1596203 A1 | 11/2005 |
| JP | 08278105 A | 10/1996 |
| JP | 08327306 A | 12/1996 |
| JP | 2009047547 A | 3/2009 |
| JP | 2013205407 A | 10/2013 |
| WO | WO 2015/078301 A1 | 6/2015 |
| WO | WO 2015/139403 A1 | 9/2015 |
| WO | WO 2015/168992 A1 | 11/2015 |

OTHER PUBLICATIONS

International Search Report, Application No. PCT/CN2014/083215, dated Jan. 28, 2015, 4 pages.
International Search Report for PCT/CN2014/090968, dated Jan. 21, 2015, 4 pages.
English translation of International Search Report for PCT/CN2014/090968, dated Jan. 21, 2 pages.

* cited by examiner

TIME GRATING LINEAR DISPLACEMENT SENSOR BASED ON ALTERNATING LIGHT FIELD

RELATED APPLICATIONS

The present application is a National Phase entry of PCT Application No. PCT/CN2014/090968, filed Nov. 13, 2014, which claims priority from CN Patent Application No. 201310632299.8, filed Nov. 29, 2013, said applications being hereby incorporated by reference herein in their entirety.

TECHNICAL FIELD

The present invention relates to a sensor. More specifically, the present invention relates to a sensor used in precision measurements of linear displacement in the optical field.

BACKGROUND ART

In the optical field, the sensing technologies used in precision measurements of linear displacement mainly include grating and laser interferometer.

A grating measures a displacement by way of counting the number of bands in a moiré fringe. It employs the technology of precision machinery subdivision to add densely distributed and equally spaced grating lines on the surfaces of index grating and scale grating. When in use, the index grating and scale grating are stacked together with leaving only a suitable small space therebetween; in addition, a very small angle is held between the grating lines of the two gratings. That is to say, the grating lines of the two gratings intersect with each other. Subsequently, a light source with constant intensity is used to illuminate the two gratings in a direction that is vertical to the plane defined by the intersected grating lines of the two gratings. Accordingly, light passes through the small spaces formed by the intersected grating lines of the two gratings and then generates the fringes formed by a series of light and shade strips (in other words, moiré fringe). In this context, a grating measurement for spatial displacement could be achieved by counting the number of changes in light and shade of the generated moiré fringe. The measurement accuracy and resolution of this approach depend on the fineness of grating lines. Nevertheless, it is known that the grating line fineness alone is very difficult to achieve a precision measurement of linear displacement within the range of from 1 μm to 0.1 μm. In order to achieve the foregoing measurement, a high precision electronic subdivision technology needs to be adopted. While such technology makes grating manufacturing process more difficult. In addition, the gratings produced in such way are associated with high cost and low interference capacity.

A laser interferometer functions based on the light wave interference effect, which measures a displacement by way of counting the number of wavelengths of a light wave. It is able to make a superposition of two light signals with different optical paths or different frequencies, which then generates a light intensity signal whose amplitude or phase would change along with a displacement. In this way, it is able to achieve highly precise measurements for displacements within the range of respective light wavelength. However, it is noted that this approach has a very high requirement for its laser. In addition, it is very expensive and certain external environmental factors can easily interfere with it. Moreover, it cannot be used for making measurements at working sites for a long period of time.

In recent years, a new type of time grating sensor has been developed in China. With this type, the time grating sensor uses a clock pulse as the measurement standard. The currently available time grating linear displacement sensors may be divided into two major types, namely magnetic field type and electric field type. A magnetic field type time grating makes measurements by virtue of the electromagnetic induction mechanism. However, most magnetic conducting materials have poor machinability and their production process needs winding coils. As a result, this type of time grating sensor has low production efficiency. In addition, since driving its stator coils requires a quite high driving power, its power consumption is considerably high. An electric field type time grating makes measurements by virtue of the alternating electric field coupling mechanism. For example, in the Chinese patent CN102288100B with the title "Time grating linear displacement sensor based on alternating electric field", it has disclosed an electric field type time grating sensor. It employs the semiconductor processing technology, and thus has high production accuracy and consistency. However, due to the reasons that an electric field signal is in a divergent state in an air gap and that it requires the parallel mounting distance between its sizing body and probe body to be as short as possible, the production and installation of this sensor are relatively difficult.

SUMMARY OF INVENTION

One object of the present invention is to provide a time grating linear displacement sensor based on an alternating light field, which can be used in the optical technical field to make precision measurements for linear displacements. It has the advantages of high precision, low energy consumption, low cost; in addition, it is easy to produce and install.

The time grating linear displacement sensor based on alternating light field according to the present invention comprises a fixed pole plate and a movable pole plate, wherein the fixed pole plate and the movable pole plate are arranged in parallel positions and a space is left therebetween; in addition, an upper part and a lower part of the fixed pole plate are respectively provided with a row of square shaped fixed pole plate light transmitting surfaces which are uniformly distributed, wherein a starting position of the row of fixed pole plate light transmitting surfaces located on the upper part of the fixed pole plate has a difference equal to one-half of the width of one fixed pole plate light transmitting surface from a starting position of the row of fixed pole plate light transmitting surfaces located on the lower part of the fixed pole plate; moreover, in a row of fixed pole plate light transmitting surfaces, a distance between two neighboring fixed pole plate light transmitting surfaces is equal to the width of one fixed pole plate light transmitting surface; furthermore, each one of a rear upper position and a rear lower position of the fixed pole plate is provided with a group of non-interfering light emitting devices. An upper part and a lower part of the movable pole plate are respectively provided with two semi-sinusoidal (that is to say, the area defined by the sine curves within the region [0, π]) movable pole plate light transmitting surfaces, wherein the movable pole plate light transmitting surfaces are directly facing the fixed pole plate light transmitting surfaces, a width of the movable pole plate light transmitting surface is equal to a width of the fixed pole plate light transmitting surface, a height of the movable pole plate light transmitting surface is less than one-half of a height of the fixed pole plate light transmitting surface; in addition, an arrangement manner of the two movable pole plate light transmitting surfaces located on the lower part of the movable pole plate is the same as an arrangement manner of the two movable pole plate light transmitting surfaces located on the upper part of the movable pole plate, and a starting position of the two movable pole plate light transmitting surfaces located on the lower part of the movable pole plate is aligned with a starting position of the two movable pole plate light transmitting surfaces located on the upper part of the movable pole plate, wherein the respective starting positions of the two movable pole plate light transmitting surfaces located on the upper part of the movable pole plate have an interval of a width of one movable pole plate light transmitting surface along a direction of the width of the movable pole plate, and an interval distance between the two movable pole plate light transmitting surfaces located on the upper part of the movable pole plate along the height of the movable pole plate is greater than the height of one movable pole plate light transmitting surface and less than one-half of the height of one fixed pole plate light transmitting surface. In addition, four light sensitive receiving units, which are corresponding to the four movable pole plate light transmitting surfaces, are fixed on the movable pole plate, and photoelectric receiving surfaces of the four light sensitive receiving units cover the corresponding movable pole plate light transmitting surfaces. A terminal of one of the two light sensitive receiving units fixed on the upper part of the movable pole plate and a terminal with the same potential polarity of the other one of the two light sensitive receiving units fixed on the upper part of the movable pole plate are shorted (that is to say, the foregoing two terminals with the same potential polarity are connected together); moreover, the remaining two terminals, which share the same potential polarity, of the two light sensitive receiving units fixed on the upper part of the movable pole plate are used as respective electrical signal output terminals. In addition, a terminal of one of the two light sensitive receiving units fixed on the lower part of the movable pole plate and a terminal with the same potential polarity of the other one of the two light sensitive receiving units fixed on the lower part of the movable pole plate are shorted (that is to say, the foregoing two terminals with the same potential polarity are connected together); moreover, the remaining two terminals, which share the same potential polarity, of the two light sensitive receiving units fixed on the lower part of the movable pole plate are used as respective electrical signal output terminals.

The two groups of light emitting devices respectively provide equal amplitude, equal frequency alternating light fields whose light intensities change according to sine and cosine laws, respectively. By way of its illumination, the foregoing alternating light source is able to generate equally distributed (with an interval distance being the width of one fixed pole plate light transmitting surface) upper and lower two rows of alternating light fields on a surface of the fixed pole plate, whose light intensities change according to sine or cosine law. The movable pole plate moves relative to the fixed pole plate. As a result, the light transmitting areas of the two movable pole plate light transmitting surfaces on the upper part of the movable pole plates undergo periodic changes (that is to say, vary according to sine law). In addition, based on the photoelectric effect, the two light sensitive receiving units fixed thereon receive electrical signals varying according to the same periodical rule (which is represented by periodical variations in luminous flux through the movable pole plate light transmitting surfaces), and then output the foregoing electrical signals. Subsequently, a light field coupled signal Uoa will be obtained through a differencing calculation, which varies according to sine rule and is able to reflect differential changes of the light transmitting areas of the movable pole plate light transmitting surfaces. On the other hand, the light transmitting areas of the two movable pole plate light transmitting surfaces on the lower part of the movable pole plates undergo periodic changes (that is to say, vary according to cosine law) as well. In addition, based on the photoelectric effect, the two light sensitive receiving units fixed thereon receive electrical signals varying according to the same periodical rule (which is represented by periodical variations in luminous flux through the respective movable pole plate light transmitting surfaces), and then output the foregoing electrical signals. Subsequently, a light field coupled signal Uob will be obtained through respective differencing and amplification process, which varies according to cosine rule and is able to reflect differential changes of the light transmitting areas of the respective movable pole plate light transmitting surfaces. Next, by way of an adding circuit, the two light field coupled signals Uoa and Uob are combined into one path of traveling wave signal Uo. Further, the traveling wave signal Uo and a path of reference signal Ur with equal frequency and fixed phase respectively undergo a shaping process using a shaping circuit and a phase comparison process using a phase comparison circuit. Next, the phase difference between the foregoing two paths of signals is represented by the number of interpolated high frequency clock pulses. Subsequently, through a corresponding scale transformation, the value of linear displacement of the movable pole plate relative to the fixed pole plate could be obtained.

The width and interval distance of the fixed pole plate light transmitting surface, the width and height of the movable pole plate light transmitting surface, as well as the respective locations of the four movable pole plate light transmitting surfaces on the movable pole plate shall be determined to meet the following requirements, including making it easy for installation of light sensitive receiving units, ensuring that the maximum light transmitting areas of the two movable pole plate light transmitting surfaces on the upper part (or lower part) of the movable pole plate are equal, as well as ensuring that the maximum luminous fluxes of the two movable pole plate light transmitting surfaces on the upper part (or lower part) of the movable pole plate are equal, so as to obtain the light field coupled signal with its amplitude varying according to sine (or cosine) law. On the other hand, the technical features including that a terminal of one of the two light sensitive receiving units fixed on the upper part (or lower part) of the movable pole plate and a terminal with the same potential polarity of the other one of the two light sensitive receiving units fixed on the upper part (or lower part) of the movable pole plate are shorted and that the remaining two terminals, which share the same potential polarity, of the foregoing two light sensitive receiving units are used as respective electrical signal output terminals are for the purpose of making it easier to conduct the differencing calculation for the electrical signals that are able to reflect the periodical variations in luminous flux through the movable pole plate light transmitting surfaces received by the two light sensitive receiving units, so as to ensure measurement accuracy.

Further, the light emitting devices mentioned above are side light optical fiber or semiconductor surface light source, which are fixedly mounted to the rear upper and rear lower parts of the fixed pole plate. Two sinusoidal excitation power sources with equal amplitude and equal frequency and ninety degrees in phase difference drive two semiconductor laser generators to illuminate on two groups of side light optical fiber or semiconductor surface light sources, so as to generate the alternating light source.

Further, the light sensitive receiving units are photocells or SMD (surface mounted device) photosensitive diode.

Further, the electrical signals generated from the two light sensitive receiving units fixed on the upper part of the movable pole plate undergo a differencing process through a first differential amplifier circuit to reach the light field coupled signal Uoa; and the electrical signals generated from the two light sensitive receiving units fixed on the lower part of the movable pole plate undergo a differencing process through a second differential amplifier circuit to reach the light field coupled signal Uob.

Further, the traveling wave signal Uo and the reference signal Ur with equal frequency undergo a shaping process through the shaping circuit to form respective square waves, and then undergo a phase comparison process to obtain the value of the linear displacement of the movable pole plate relative to the fixed pole plate by way of calculating a time difference of the foregoing two square waves passing the zero point.

The technical solution of the present invention is "a measurement idea using time grating sensor+an excitation method using magnetic grating and inductosyn+a structure of optical grating and rotary transformer." The present invention employs a newly developed approach of synthesizing electrical traveling wave with standing waves that are based on alternating light field, and accordingly it has combined the various advantages of a variety of different displacement measurement approaches.

The present invention offers the following benefits: employing alternating light sources whose light intensities vary according to sine and cosine rules to form alternating light fields, over a course of movable pole plate moving, the respective luminous fluxes received by the light sensitive receiving units varying, and such varying has been further converted to two paths of equal frequency light field coupled signals based on the photoelectric effect and undergoing a differencing process of electrical signal, next, the foregoing two paths of signals being combined into a path of traveling wave electrical signal, subsequently, the phase change of the foregoing path of traveling wave electrical signal being measured by way of an interpolation of high frequency clock pulse, so as to obtain the value of a linear displacement of the movable pole plate relative to the fixed pole plate by further calculation. It has the advantages of high precision, low energy consumption, low cost, as well as easy production and installation.

DESCRIPTION OF EMBODIMENTS

Figure 1:
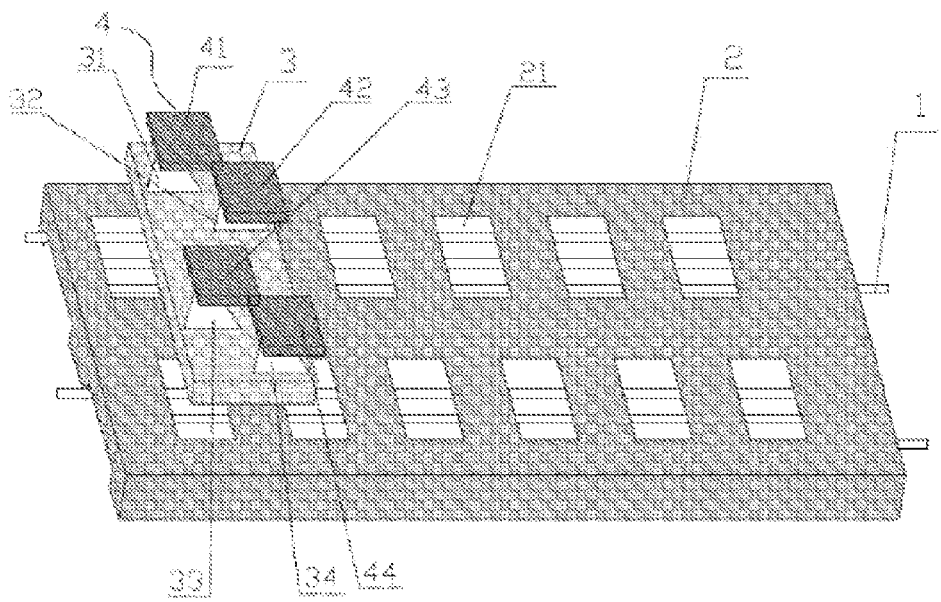
FIG. 1 is a schematic exploded view of the present invention.

The present invention will be further described in reference to the accompanying drawings.

As shown in FIGS. 1, 2, 3, 4, and 5, the present invention is a time grating linear displacement sensor based on alternating light field, which comprises a fixed pole plate 2, a movable pole plate 3, four light sensitive receiving units 4 and two groups of light emitting devices 1, wherein the fixed pole plate 2 and the movable pole plate 3 are arranged in parallel positions and a space of 0.4 mm is left therebetween; the four light sensitive receiving units 4 employ four SMD (surface mounted device) photosensitive diodes of the same type (alternatively may employ four photocells of the same type); in addition, the light emitting device could be side light optical fiber 1 (alternatively it may be a surface light source formed by LED), wherein one group of the side light optical fiber 1 have been fixed on an upper rear part of the fixed pole plate 2, while the other group of the side light optical fiber 1 have been fixed on an lower rear part of the fixed pole plate 2; in addition, the two groups of side light optical fiber 1 have been separated by a boss 22, which is covered by a shielding material (alternatively they may be separated by disposing an opaque separator in between), such that the lights emitted from the two groups of side light optical fiber 1 do not interfere with each other.

Glass is used as the substrate. The "grating surface" (which is equivalent to covering a light shielding material) used for blocking light has been produced by way of a micro-machining processing method; while the areas that are not covered by the grating surface are the light transmitting surfaces. The upper surface of the substrate of the fixed pole plate 2 is covered by a light shielding material, which allows each of the upper part and lower part of the fixed pole plate 2 to be left with a row of rectangular fixed pole plate light transmitting surfaces 21 that are not covered by the light shielding material, wherein the width W of each fixed pole plate light transmitting surface 21 is 5.0 mm, while the height of each fixed pole plate light transmitting surface 21 is 10 mm. In addition, in each row of the fixed pole plate light transmitting surfaces 21, the interval distance G between two neighboring fixed pole plate light transmitting surfaces 21 is 5.0 mm. Moreover, the number of the fixed pole plate light transmitting surfaces 21 on the upper part of the fixed pole plate 2 is equal to the number of the fixed pole plate light transmitting surfaces 21 on the lower part of the fixed pole plate, and there is a difference of 2.5 mm between their staring positions.

An upper surface of the substrate of the movable pole plate 3 is covered by a light shielding material as well, such that the upper part of the movable pole plate 3 is left with the first movable pole plate light transmitting surface 31 and the second movable pole plate light transmitting surface 32, which are not covered by the light shielding material; and similarly, the lower part of the movable pole plate 3 is left with the third movable pole plate light transmitting surface 33 and the fourth movable pole plate light transmitting surface 34, which are not covered by the light shielding material as well. In addition, the shape of each one of the first, second, third and fourth movable pole plate light transmitting surfaces is the area defined by a sine curve within the region [0, π], with a width of 5.0 mm and a height of 4.9 mm. Moreover, the first movable pole plate light transmitting surface 31 and the second movable pole plate light transmitting surface 32 are directly facing the row of fixed pole plate light transmitting surfaces 21 on the upper part of the fixed pole plate 2 in a front rear direction. The first movable pole plate light transmitting surface 31 and the second movable pole plate light transmitting surface 32 are arranged on the upper part of the movable pole plate 3 in a way as follows, the starting position of the second movable pole plate light transmitting surface 32 is located on the right side of the starting position of the first movable pole plate light transmitting surface 31 along the wide of the movable pole plate with a distance a of 5.0 mm, while the starting position of the second movable pole plate light transmitting surface 32 is located on the down side of the starting position of the first movable pole plate light transmitting surface 31 along the height of the movable pole plate with a distance b of 4.95 mm. Similarly, the third movable pole plate light transmitting surface 33 and the fourth movable pole plate light transmitting surface 34 are arranged on the lower part of the movable pole plate 3 in a way as follows, the third movable pole plate light transmitting surface 33 is aligned with the first movable pole plate light transmitting surface 31 in a direction along the high direction of the movable pole plate, and the fourth movable pole plate light transmitting surface 34 is aligned with the second movable pole plate light transmitting surface 32 in a direction along the height of the movable pole plate; in addition, the starting position of the fourth movable pole plate light transmitting surface 34 is located on the right side of the starting position of the third movable pole plate light transmitting surface 33 along the wide of the movable pole plate with a distance a of 5.0 mm, while the starting position of the fourth movable pole plate light transmitting surface 34 is located on the down side of the starting position of the third movable pole plate light transmitting surface 33 along the high direction of the movable pole plate with a distance b of 4.95 mm.

Figure 6:
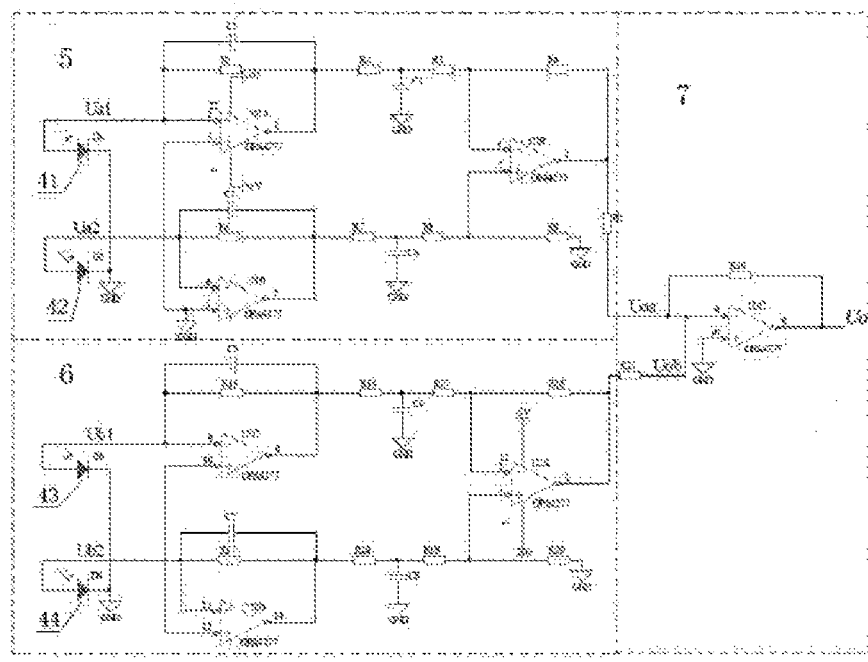
FIG. 6 is a schematic circuit diagram showing a synthesis of the traveling wave signal Uo of the present invention.

The four light sensitive receiving units 4 are respectively, a first SMD photosensitive diode 41 (in other words, D1), a second SMD photosensitive diode 42 (in other words, D2), a third SMD photosensitive diode 43 (in other words, D3), and a fourth SMD photosensitive diode 44 (in other words, D4); and all of the foregoing elements have been fixedly installed on the movable pole plate 3. Moreover, the photoelectric receiving surface of the first SMD photosensitive diode 41 completely covers the entire first movable pole plate light transmitting surface 31, the photoelectric receiving surface of the second SMD photosensitive diode 42 completely covers the entire second movable pole plate light transmitting surface 32, the photoelectric receiving surface of the third SMD photosensitive diode 43 completely covers the entire third movable pole plate light transmitting surface 33, and the photoelectric receiving surface of the fourth SMD photosensitive diode 44 completely covers the entire fourth movable pole plate light transmitting surface 34, please refer to FIGS. 5 and 6, the negative electrode of first SMD photosensitive diode 41 is connected to the negative electrode of second SMD photosensitive diode 42, and they are grounded; the positive electrode of first SMD photosensitive diode 41 is used as the output terminal of the electrical signal Ua1 that is able to represent the change of luminous flux through the first movable pole plate light transmitting surface 31, and the positive electrode of second SMD photosensitive diode 42 is used as the output terminal of the electrical signal Ua2 that is able to represent the change of luminous flux through the second movable pole plate light transmitting surface 32; in addition, the negative electrode of third SMD photosensitive diode 43 is connected to the negative electrode of fourth SMD photosensitive diode 44, and they are grounded; the positive electrode of third SMD photosensitive diode 43 is used as the output terminal of the electrical signal Ub1 that is able to represent the change of luminous flux through the third movable pole plate light transmitting surface 33, and the positive electrode of fourth SMD photosensitive diode 44 is used as the output terminal of the electrical signal Ub2 that is able to represent the change of luminous flux through the fourth movable pole plate light transmitting surface 34.

A group of side light optical fiber 1, which has been fixed on an upper rear part of the fixed pole plate 2, is able to provide an alternating light source to the row of fixed pole plate light transmitting surfaces 21, which is located on the upper part of the fixed pole plate 2. The foregoing alternating light source is generated by way of that a sinusoidal excitation power source drives a semiconductor laser generator, the laser light generated from which then illuminates the group of side light optical fiber 1; in addition, the foregoing alternating light source then forms a row of alternating light fields that is equally distributed (with an interval distance of the width of one fixed pole plate light transmitting surface) on the upper part of the surface of the fixed pole plate 2, and its light field intensity is $U_a = U_0 + U_m \sin \omega t$ (where $U_0$ is a DC offset component thereof). On the other hand, a group of side light optical fiber 1, which has been fixed on a lower rear part of the fixed pole plate 2, is able to provide an alternating light source to the row of fixed pole plate light transmitting surfaces 21, which is located on the lower part of the fixed pole plate 2. The foregoing alternating light source is generated by way of that a cosine excitation power source, which has the same amplitude, the same frequency and a phase difference of 90 degrees with the above mentioned sinusoidal excitation power source, drives another semiconductor laser generator, the laser light generated from which then illuminates the group of side light optical fiber 1; in addition, the foregoing alternating light source then forms a row of alternating light fields that is equally distributed (with an interval distance of the width of one fixed pole plate light transmitting surface) on the lower part of the surface of the fixed pole plate 2, and its light field intensity is $U_b = U_0 + U_m \cos \omega t$ (where $U_0$ is a DC offset component thereof).

Figure 2:
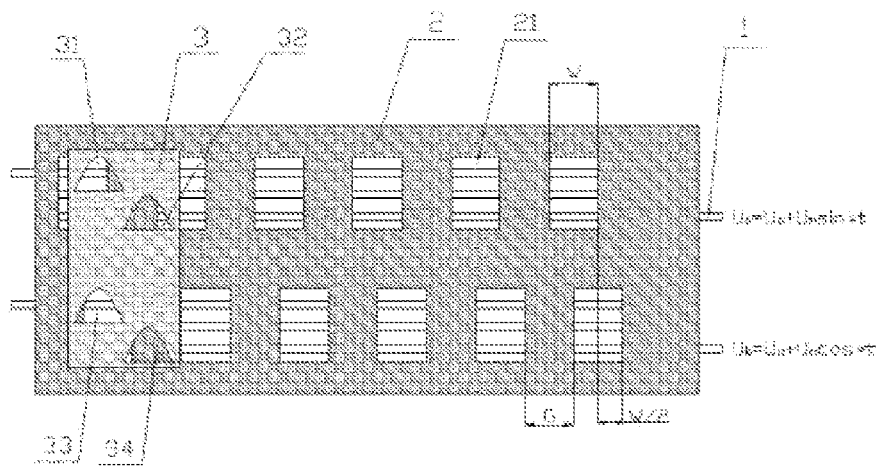
FIG. 2 is a schematic view showing the change of luminous flux due to a movement of the movable pole plate relative to the fixed pole plate according to the present invention (excluding the light sensitive receiving units).
Figure 3:
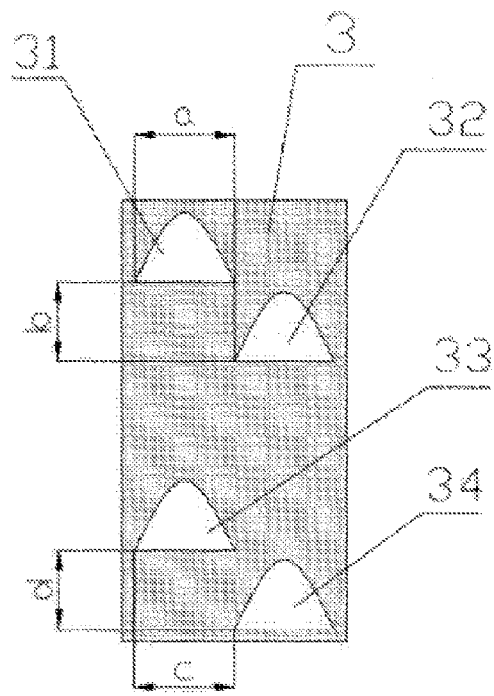
FIG. 3 is a schematic structural view of the movable pole plate of the present invention.
Figure 4:
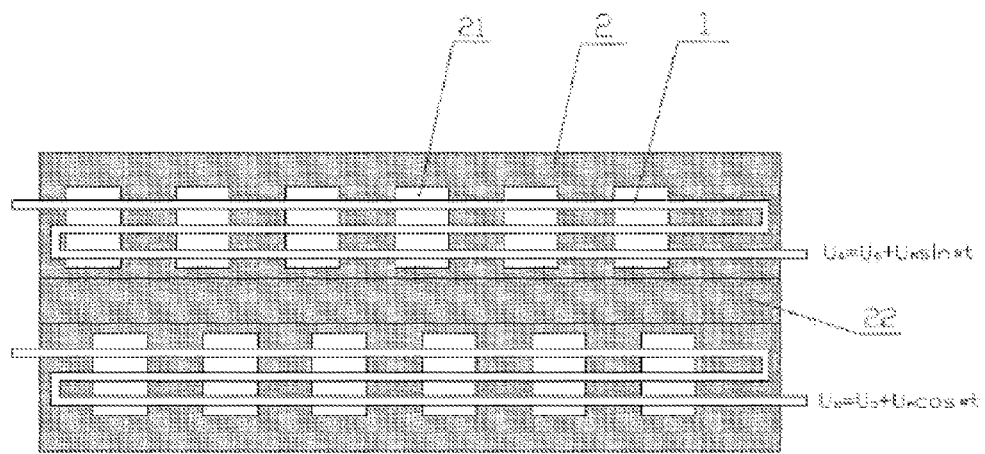
FIG. 4 is a view of the mounting positions of the light emitting devices of the present invention.
Figure 5:
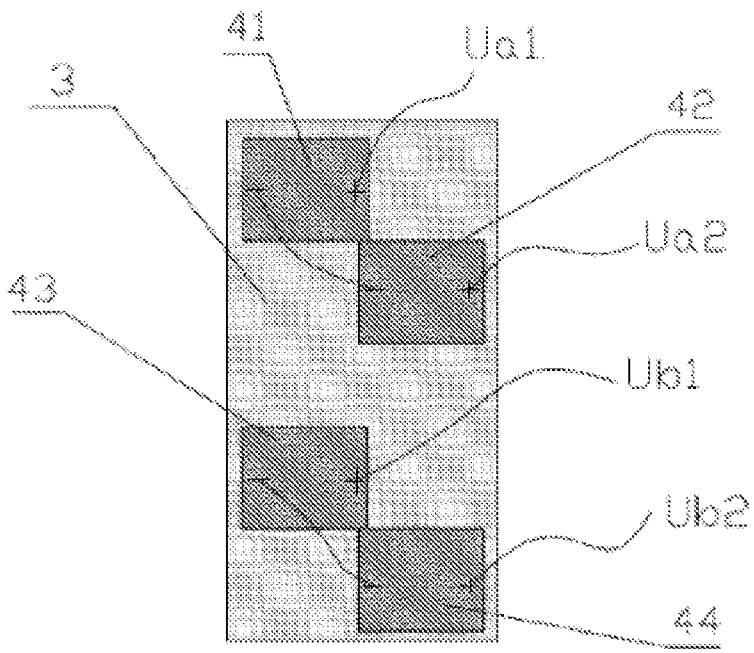
FIG. 5 is a schematic connection diagram of a differential measurement of the light sensitive receiving units on the movable pole plate of the present invention.

When the movable pole plate 3 makes a displacement relative to the fixed pole plate 2 from the position shown in FIG. 2 along a left towards right direction, the light transmitting area of the first movable pole plate light transmitting surface 31 would undergo a periodical change of becoming gradually smaller, and then gradually larger again; while the light transmitting area of the second movable pole plate light transmitting surface 32 would undergo a periodical change of becoming gradually larger, and then gradually smaller again. Accordingly, the electrical signal Ua1 outputted from the first SMD photosensitive diode 41 and the electrical signal Ua2 outputted from the second SMD photosensitive diode 42 make corresponding periodical changes as well. In reference to FIG. 6, the positive electrode of the first SMD photosensitive diode 41 is connected to the second pin of the amplifier U1A (OPA4277) within the first differential amplifying circuit 5, while the positive electrode of the second SMD photosensitive diode 42 is connected to the sixth pin of the amplifier U1B (OPA4277) within the first differential amplifying circuit 5; in addition, the output signal is connected to the sixth pin and fifth pin of another amplifier U2B (OPA4277) within the first differential amplifying circuit 5 to form a differencing circuit, and a light field coupled signal Uoa is outputted from the seventh pin of the amplifier U2B, which could be expressed as follows:

$$Uoa = KeUm \sin \omega t \sin \pi x/W$$

In the foregoing equation, Ke is light field coupling coefficient, x is the relative displacement between the movable pole plate and the fixed pole plate, W is width of fixed pole plate light transmitting surface, and in this case the value of the width is set as 5.0 mm.

Similarly, the light transmitting area of the third movable pole plate light transmitting surface 33 would undergo a periodical change of becoming gradually larger, and then gradually smaller again, while the light transmitting area of the fourth movable pole plate light transmitting surface 34 would undergo a periodical change of becoming gradually smaller, and then gradually larger again. Accordingly, the electrical signal Ub1 outputted from the third SMD photosensitive diode 43 and the electrical signal Ub2 outputted from the fourth SMD photosensitive diode 44 make corresponding periodical changes as well. In addition, the positive electrode of the third SMD photosensitive diode 43 is connected to the ninth pin of the amplifier U1C (OPA4277) within the second differential amplifying circuit 6, while the positive electrode of the fourth SMD photosensitive diode 44 is connected to the thirteen pin of the amplifier U1D (OPA4277) within the second differential amplifying circuit 6; moreover, the output signal is connected to the second pin and third pin of another amplifier U2A (OPA4277) within the second differential amplifying circuit 6 to form a differencing circuit, and a light field coupled signal Uob is outputted from the first pin of the amplifier U2A, which could be expressed as follows:

$$Uob = KeUm \cos \omega t \cos \pi x/W$$

In the foregoing equation, Ke is light field coupling coefficient, x is the relative displacement between the movable pole plate and the fixed pole plate, W is width of fixed pole plate light transmitting surface, and in this case the value of the width is set as 5.0 mm.

In addition, an adding circuit 7, which employs the adding machine U2C (OPA4277) further processes the two paths of light field coupled signals Uoa and Uob, the combined new signal will be then outputted from the eighth pin of the adding machine U2C, which could be represented by the mathematical expression as follows:

$$Uo = Uoa + Uob = KeUm \sin \omega t \sin \pi x/W + KeUm \cos \omega t \cos \pi x/W = KeUm \cos(\omega t - \pi x/W)$$

In the foregoing equation, Ke is light field coupling coefficient, x is the relative displacement between the movable pole plate and the fixed pole plate, W is width of fixed pole plate light transmitting surface, and in this case the value of the width is set as 5.0 mm.

Figure 7:
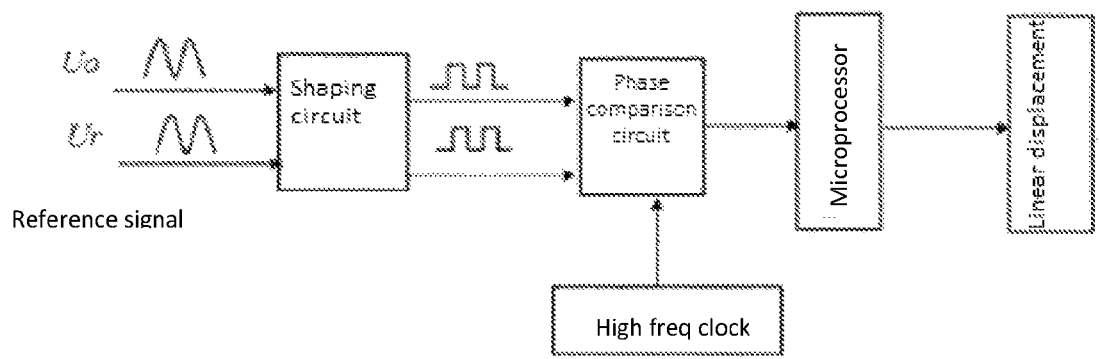
FIG. 7 is a block diagram of the signal processing of the present invention.

In reference to FIG. 7, the traveling wave signal Uo following combination, along with a path of reference cosine signal Ur with equal frequency and a fixed phase, will undergo a shaping process through a shaping circuit to be transformed to two paths of square wave signals correspondingly, which are then sent to a phase comparison circuit to undergo a phase comparison process; next the phase difference between the foregoing two signals is obtained through the technology of interpolation of high frequency clock; further foregoing phase difference is processed by a microprocessor (in other words, calculating the time difference of the two square waves passing the zero point), so as to obtain the value of the linear displacement of the movable pole plate 3 relative to the fixed pole plate 2.

In the above described embodiments, the first, second, third, and fourth movable pole plate light transmitting surfaces share the same size, while their heights could be selected according to actual requirements, which could be any suitable values that are less than ½ of the height of one fixed pole plate light transmitting surface, such as 2 mm, 3 mm, 4 mm, and the like. In addition, the distance of the starting position of the second movable pole plate light transmitting surface 32 from the starting position of the first movable pole plate light transmitting surface 31 along the direction of the height of the movable pole plate, and the distance of the starting position of the fourth movable pole plate light transmitting surface 34 from the starting position of the third movable pole plate light transmitting surface 33 along the direction of the height of the movable pole plate could be any other values that are greater than the respective height of the first, second, third and fourth movable pole plate light transmitting surfaces and less than 5 mm, such as 2.1 mm, 3.1 mm, 4.1 mm, and the like, which could be selected based on the packaging conditions of various types of SMD photosensitive diodes.

What is claimed is:

1. A time grating linear displacement sensor based on alternating light field, comprising:
   a fixed pole plate; and
   a movable pole plate;
   wherein the fixed pole plate and the movable pole plate are arranged in parallel positions and a space is left therebetween;
   wherein an upper part and a lower part of the fixed pole plate are respectively provided with a row of square shaped fixed pole plate light transmitting surfaces that are uniformly distributed thereon, wherein a starting position of the row of fixed pole plate light transmitting surfaces located on the upper part of the fixed pole plate has a difference equal to one-half of the width of one fixed pole plate light transmitting surface from a starting position of the row of fixed pole plate light transmitting surfaces located on the lower part of the fixed pole plate;
   wherein in a row of fixed pole plate light transmitting surfaces, a distance between two neighboring fixed pole plate light transmitting surfaces is equal to the width of one fixed pole plate light transmitting surface;
   wherein each one of a rear upper position and a rear lower position of the fixed pole plate is provided with a group of non-interfering light emitting devices;
   wherein an upper part and a lower part of the movable pole plate are respectively provided with two semi-sinusoidal movable pole plate light transmitting surfaces, wherein the movable pole plate light transmitting surfaces are directly facing the fixed pole plate light transmitting surfaces, a width of the movable pole plate light transmitting surface is equal to a width of the fixed pole plate light transmitting surface, a height of the movable pole plate light transmitting surface is less than one-half of a height of the fixed pole plate light transmitting surface, an arrangement manner of the two movable pole plate light transmitting surfaces located on the lower part of the movable pole plate is the same as an arrangement manner of the two movable pole plate light transmitting surfaces located on the upper part of the movable pole plate, and a starting position of the two movable pole plate light transmitting surfaces located on the lower part of the movable pole plate is aligned with a starting position of the two movable pole plate light transmitting surfaces located on the upper part of the movable pole plate, the respective starting positions of the two movable pole plate light transmitting surfaces located on the upper part of the movable pole plate has an interval distance of a width of one movable pole plate light transmitting surface along a direction of the width of the movable pole plate, and an interval distance between the two movable pole plate light transmitting surfaces located on the upper part of the movable pole plate along a direction of the height of the movable pole plate is greater than the height of one movable pole plate light transmitting surface and less than one-half of the height of one fixed pole plate light transmitting surface;

wherein four light sensitive receiving units, which correspond to the four movable pole plate light transmitting surfaces, are fixed on the movable pole plate, and photoelectric receiving surfaces of the four light sensitive receiving units cover the corresponding movable pole plate light transmitting surfaces, a terminal of one of the two light sensitive receiving units fixed on the upper part of the movable pole plate and a terminal with the same potential polarity of the other one of the two light sensitive receiving units fixed on the upper part of the movable pole plate are shorted, moreover, the remaining two terminals of the two light sensitive receiving units fixed on the upper part of the movable pole plate are used as respective electrical signal output terminals, a terminal of one of the two light sensitive receiving units fixed on the lower part of the movable pole plate and a terminal with the same potential polarity of the other one of the two light sensitive receiving units fixed on the lower part of the movable pole plate are shorted, the remaining two terminals of the two light sensitive receiving units fixed on the lower part of the movable pole plate are used as respective electrical signal output terminals;

wherein the two groups of light emitting devices respectively provide equal amplitude and equal frequency alternating light fields whose light intensities change according to sine and cosine laws, respectively;

wherein the alternating light source generates equally distributed upper and lower two rows of alternating light fields on a surface of the fixed pole plate, whose light intensities change according to sine or cosine law, the movable pole plate moves relative to the fixed pole plate, the four light sensitive receiving units output electrical signals that are representing corresponding luminous fluxes changes through the movable pole plate light transmitting surfaces, which, following a differencing calculation, generate light field coupled signals Uoa and Uob, which are respectively corresponding to differential changes in light transmitting areas of the two movable pole plate light transmitting surfaces, the two coupled signals are further combined into one path of traveling wave signal Uo by an adding circuit, the traveling wave signal Uo and a path of reference signal Ur with equal frequency and a fixed phase respectively undergo a shaping process using a shaping circuit, and then a phase comparison process using a phase comparison circuit, the phase difference between the two paths of signals is represented by the number of interpolated high frequency clock pulses, subsequently through a corresponding scale transformation, a value of linear displacement of the movable pole plate relative to the fixed pole plate is thus obtained.

2. The time grating linear displacement sensor based on alternating light field as set forth in claim 1, wherein the light emitting devices are side light optical fiber or semiconductor surface light source, which are fixedly mounted to the rear upper and rear lower parts of the fixed pole plate, and two sinusoidal excitation power sources with equal amplitude and equal frequency and ninety degrees in phase difference respectively drive two semiconductor laser generators to illuminate on two groups of side light optical fiber or semiconductor surface light sources, so as to generate the alternating light source.

3. The time grating linear displacement sensor based on alternating light field as set forth in claim 1, wherein the light sensitive receiving units are photocells or SMD photosensitive diode.

4. The time grating linear displacement sensor based on alternating light field as set forth in claim 1, wherein the electrical signals outputted by the two light sensitive receiving units fixed on the upper part of the movable pole plate undergo a differencing process through a first differential amplifier circuit to reach the light field coupled signal Uoa; and the electrical signals outputted by the two light sensitive receiving units fixed on the lower part of the movable pole plate undergo a differencing process through a second differential amplifier circuit to reach the light field coupled signal Uob.

5. The time grating linear displacement sensor based on alternating light field as set forth in claim 1, wherein the traveling wave signal Uo and the equal frequency reference signal Ur undergo a shaping process through the shaping circuit to form respective square waves, and then undergo a phase comparison process to obtain the value of the linear displacement of the movable pole plate relative to the fixed pole plate by way of calculating a time difference of the two square waves passing the zero point.

* * * * *